(12) United States Patent
Lu et al.

(10) Patent No.: US 11,443,080 B2
(45) Date of Patent: Sep. 13, 2022

(54) PARAMETRIC DESIGN METHOD FOR FAN COIL UNIT BASED ON BIM

(71) Applicant: TIANJIN ARCHITECTURE DESIGN INSTITUTE, Tianjin (CN)

(72) Inventors: Wanmei Lu, Tianjin (CN); Jia Feng, Tianjin (CN); Cheng Zhang, Tianjin (CN); Qian Tong, Tianjin (CN); Xun Yang, Tianjin (CN); Min Xing, Tianjin (CN); Haoyang Yin, Tianjin (CN); Xiaolei Ji, Tianjin (CN); Yu Cao, Tianjin (CN); Longjian Li, Tianjin (CN)

(73) Assignee: TIANJIN ARCHITECTURE DESIGN INSTITUTE, Tianjin (CN)

( * ) Notice: Subject to any disclaimer, the term of this patent is extended or adjusted under 35 U.S.C. 154(b) by 592 days.

(21) Appl. No.: 16/475,077

(22) PCT Filed: Dec. 28, 2017

(86) PCT No.: PCT/CN2017/119504
§ 371 (c)(1),
(2) Date: Sep. 16, 2019

(87) PCT Pub. No.: WO2018/121686
PCT Pub. Date: Jul. 5, 2018

(65) Prior Publication Data
US 2020/0097685 A1 Mar. 26, 2020

(30) Foreign Application Priority Data
Dec. 29, 2016 (CN) .......................... 201611246602.0

(51) Int. Cl.
*G06F 30/17* (2020.01)
*F24F 11/89* (2018.01)
(Continued)

(52) U.S. Cl.
CPC ............ *G06F 30/17* (2020.01); *F24F 1/0007* (2013.01); *F24F 11/89* (2018.01); *G06F 30/13* (2020.01)

(58) Field of Classification Search
CPC .......... G06F 30/00; G06F 30/17; G06F 30/13; G06F 2113/14; F24F 1/0007; F24F 13/02
(Continued)

(56) References Cited

U.S. PATENT DOCUMENTS 10,331,845 B2 * 6/2019 Kiff .......................... G06T 17/00

OTHER PUBLICATIONS

Ahn, Ki-Uhn et al., "BIM Interface for Full vs Semi-Automated Building Energy Simulation", 2013, Energy and Buildings 68, Elsevier B.V. (Year: 2013).*

(Continued)

*Primary Examiner* — Cedric Johnson

(57) ABSTRACT

A parametric design method for a fan coil unit based on BIM (Building Information Modeling) includes steps of: determining a basic sample; parametrically modeling; setting pipe connection locations and connection sizes of a two-pipe fan coil and a four-pipe fan coil; setting component visibility; completing control settings of left-right one-click selection for the fan coil; arranging an air pipe behind an air outlet of the fan coil; producing air duct flexible connectors; producing diffusers; adding parameter controls of a "yes or no" type to a return air box, a lower return air flange, and a back to return air flange; completing production of pipes and connectors, and naming. In a heating and ventilation BIM design of building engineering, with the above method, efficiencies of designing, modeling and plotting are obviously increased.

6 Claims, 1 Drawing Sheet

(51) Int. Cl.
 *G06F 30/13* (2020.01)
 *F24F 1/0007* (2019.01)
(58) Field of Classification Search
 USPC .............................................. 703/1
 See application file for complete search history.

(56) References Cited

OTHER PUBLICATIONS

Lee, Kwang Jun, "A Formal and Ontological Approach to Embed Commissioning Test Protocols into Building Information Model", May 2013, Carnegie Mellon University. (Year: 2013).*

* cited by examiner

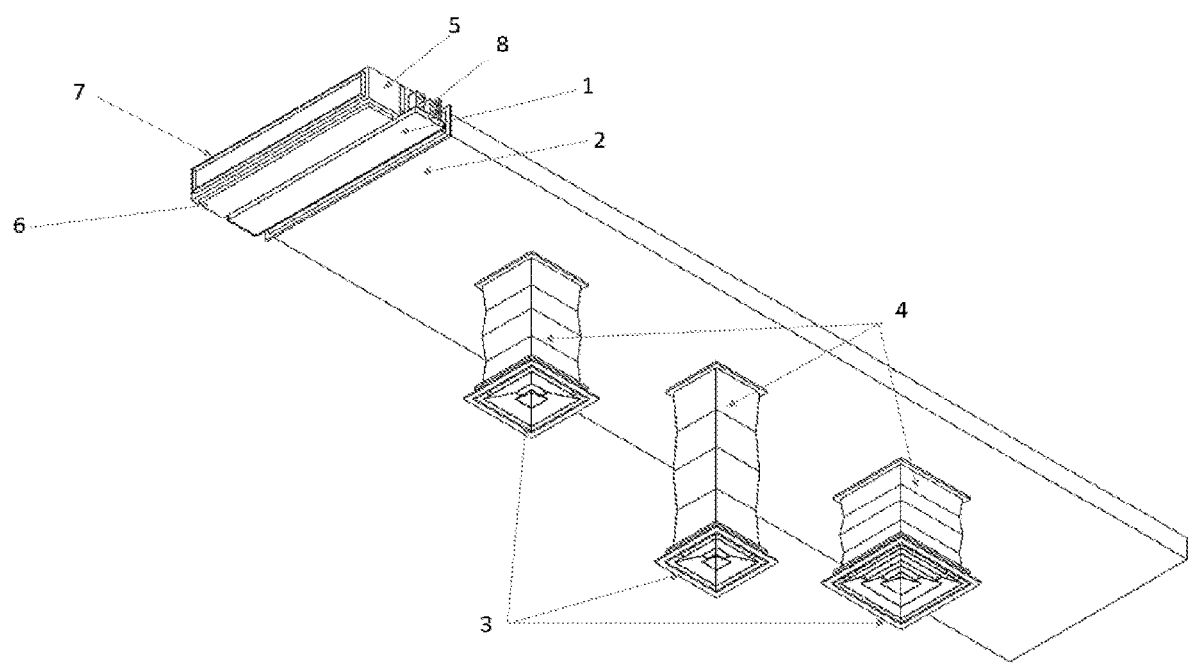

PARAMETRIC DESIGN METHOD FOR FAN COIL UNIT BASED ON BIM

CROSS REFERENCE OF RELATED APPLICATION

This is a U.S. National Stage under 35 U.S.C 371 of the international Application PCT/CN2017/119504, filed Dec. 28, 2017, which claims priority under 35 U.S.C. 119(a-d) to CN 201611246602.0, filed Dec. 29, 2016.

BACKGROUND OF THE PRESENT INVENTION

Field of Invention

The present invention relates to a field of building design, and more particularly to a parametric design method for a fan coil unit based on BIM (Building Information Modeling).

Description of Related Arts

BIM (Building Information Modeling) is a rapidly developing design means in the building engineering design field in recent years and has already developed into an independent discipline. In building engineering of China, BIM is oriented at the three-dimensional visualization technology management information asset which is based on the digitized information and is sustainably applicable in the whole building engineering life. Moreover, BIM is the technical means required to be used in most of building engineering before the end of 2020 by the Ministry of Housing and Urban-Rural development in China.

Currently, the BIM technology in China has been applied in each stage of building engineering with different degrees, but is still in the initial stage. Particularly, in the building engineering design stage, as the initiator of BIM technology application, it is urgent to solve the current problems that the efficiency of the three-dimensional design is relatively low and the modification and adjustment workload is relatively high.

Conventionally, in the BIM field of China, when using the design software, the habits of using the foreign software are basically continued. Because the calculation and design manner of the foreign software are different, in some fields, the phenomenon that the common design has the huge repetitive work and high modification and adjustment workload is highlighted, which makes the BIM design in the conventional design fall into a condition of low efficiency. Particularly, in the heating and ventilation field, the contradiction between the high usage frequency of the fan coil in the general design and the low drawing efficiency thereof in the common BIM design software is greatly obvious.

SUMMARY OF THE PRESENT INVENTION

An object of the present invention is to provide a parametric design method for a fan coil unit based on BIM (Building Information Modeling), so as to solve problems existing in the prior art.

Technical solutions of the present invention are described as follows.

A parametric design method for a fan coil unit based on BIM comprises steps of:

(1), determining a basic sample, particularly comprising steps of: selecting a product which meets professional design requirements of heating and ventilation and current national specifications and standards as the basic sample of inclusive design model, and acquiring "sample data" of the fan coil product;

(2), parametrically modeling, particularly comprising steps of: adopting a Revit design software for modeling; selecting a family template file, named "metric mechanical equipment", in a family library; in dialog boxes of family templates and family parameters, ensuring that a checkbox of "always being vertical" of a selected family is checked; with using a "stretch" command, drawing a "sketch" in a plane view, and stretching a height thereof, so as to produce a fan coil casing; establishing reference planes respectively at edges of two sides of a fan coil, enabling the reference planes to be respectively aligned with the edges of the two sides of the fan coil and locked, and meanwhile enabling the reference planes to be symmetrical with respect to a reference plane of "center left and right" in an original family; aligning a front part of the fan coil casing with a reference plane of "center front and back" in the original family; and, in the same way, completing production of a motor and a fan at a back part and an air-out flange at a front part of the fan coil;

(3), setting pipe connection locations and connection sizes of a two-pipe fan coil and a four-pipe fan coil, a size of a return air box, and a size of a return air inlet, particularly comprising steps of: establishing a reference plane at a side of the fan coil casing, and enabling the reference plane to accurately describe the pipe connection locations for water supply and return of the two-pipe fan coil and the four-pipe fan coil; using a "stretch" tool, and producing a pipe connection member for water supply and return pipes; according to drawing parameters in the "sample data", setting a length and a distance to other pipe connections of the pipe connection member; after completing above operations, defining virtual "connector" parameters at an end of each pipe, and enabling a diameter of the pipe connection member to be consistent with a diameter of a solid connector and conform to a diameter of pipe connection in the "sample data"; producing the return air box with using the "stretch" command, ensuring that the return air box is left-right symmetrical, and enabling the return air box to be locked with the back part of the fan coil;

(4), producing an air pipe behind an air supply flange and at the front part of the fan coil; drawing the air pipe with using the "stretch" command; through adding a reference plane, realizing a parametric control on a distance between an end of the air pipe and an outlet flange; enabling a width of an air supply duct to correspond to specifications of the fan coil, and expanding to a basic modulus of air duct;

(5), producing each air duct flexible connector, particularly comprising steps of: setting reference planes respectively at a lower surface of the air supply duct and a top surface of a throat mouth of a corresponding diffuser; drawing a contour lofting path of each air duct flexible connector into a curved shape of each air duct flexible connector, and locking between the above two reference planes; using a family template file, named "metric contour", and establishing a contour family; drawing a horizontal sectional contour of each air duct flexible connector, and loading into a family of the air duct flexible connectors; lofting, and completing modeling of each air duct flexible connector;

(6), loading the family of the air duct flexible connectors into a family of the fan coil; locating on the air supply duct with using a reference plane; completing center locating of three lower air outlets according to general design requirements, and adding parameters after measuring distance marks by a distance tool, so as to realize a parametric control on a distance between a center of each lower air outlet and the air supply flange; symmetrically arranging the air duct flexible connectors on middle of the lower surface of the air supply duct; locking each diffuser at a lower end of the corresponding air duct flexible connector; according to a distance between the air supply flange and a corresponding prefabricated air outlet, parametrically controlling a horizontal location of each diffuser; with using a reference plane, completing a parameter addition for a distance between the lower surface of the air supply duct and a lower surface of the corresponding air outlet, and parametrically controlling a vertical location of each diffuser;

(7), with a center line of the fan coil as a symmetry axis, adding controls, which control in a left-right symmetrical way, for above built models; and completing control settings of left-right one-click selection for pipes, connectors and electric terminals in an overall combined model of the fan coil;

(8), establishing parametric groups, particularly comprising steps of: according to differences between the two-pipe fan coil and the four-pipe fan coil and differences among types of above 8, 8 and below 8, establishing the parametric groups; and (9), setting component visibility, particularly comprising steps of: adding display parameters of a "yes or no" type to the return air box, a back return air flange, a lower return air flange, the diffusers and the corresponding air duct flexible connectors, so as to complete a visibility control.

In the heating and ventilation BIM design of building engineering by the present invention, efficiencies of designing, modeling and plotting are obviously increased, mainly reflecting in following aspects that:

(1), the designer can directly know the design parameters of the fan coil in the model and directly select the type;

(2), after selecting the type by the designer, the shape specifications corresponding to the model change correspondingly, which increases the facticity and feasibility of the equipment occupied space and pipe connection space, so that the post adjustment is avoided;

(3), the designer can directly parametrically control the length of the air supply duct, and the number, height and locations of the diffusers, which simplifies drawing of various sections and planes and pipe connection in the BIM modeling software;

(4), the down return air and the back return air of the return air box are adjustable, and the return air box can also be canceled, which makes designing and drawing flexible;

(5), after completing arranging the equipment space location, setting the air outlet specifications and locating, through directly corresponding to the two-dimensional expressions, the graph can be plotted only with simple marks; and (6), in the project with the fan coil as the main form of air conditioner, with the present invention, the efficiencies of designing, BIM modeling and plotting can be increased by 80%.

BRIEF DESCRIPTION OF THE DRAWINGS

The figure is a sketch view of a fan coil according to the present invention.

In the figure: 1: fan coil casing; 2: air supply duct; 3: diffuser; 4: air duct flexible connector; 5: return air box; 6: lower return air flange; 7: back return air flange; and 8: pipe connection member.

DETAILED DESCRIPTION OF THE PREFERRED EMBODIMENT

The present invention is further illustrated in detail with the accompanying drawing and the preferred embodiment as follows.

As shown in the figure, a parametric design method for a fan coil unit based on BIM (Building Information Modeling) comprises steps of:

(1), determining a basic sample, particularly comprising steps of: selecting a product which meets professional design requirements of heating and ventilation and current national specifications and standards as the basic sample of inclusive design model, and acquiring "sample data" of the fan coil product;

(2), parametrically modeling, particularly comprising steps of: adopting a Revit design software for modeling; selecting a family template file, named "metric mechanical equipment", in a family library; in dialog boxes of family templates and family parameters, ensuring that a checkbox of "always being vertical" of a selected family is checked; with using a "stretch" command, drawing a "sketch" in a plane view, and stretching a height thereof, so as to produce a fan coil casing 1; establishing reference planes respectively at edges of two sides of a fan coil, enabling the reference planes to be respectively aligned with the edges of the two sides of the fan coil and locked, and meanwhile enabling the reference planes to be symmetrical with respect to a reference plane of "center left and right" in an original family; aligning a front part of the fan coil casing 1 with a reference plane of "center front and back" in the original family; and, in the same way, completing production of a motor and a fan at a back part and an air-out flange at a front part of the fan coil;

(3), setting pipe connection locations and connection sizes of a two-pipe fan coil and a four-pipe fan coil, a size of a return air box 5, and a size of a return air inlet, particularly comprising steps of: establishing a reference plane at a side of the fan coil casing 1, and enabling the reference plane to accurately describe the pipe connection locations for water supply and return of the two-pipe fan coil and the four-pipe fan coil; using a "stretch" tool, and producing a pipe connection member 8 for water supply and return pipes; according to drawing parameters in the "sample data", setting a length and a distance to other pipe connections of the pipe connection member 8; after completing above operations, defining virtual "connector" parameters at an end of each pipe, and enabling a diameter of the pipe connection member 8 to be consistent with a diameter of a solid connector and conform to a diameter of pipe connection in the "sample data"; producing the return air box 5 with using the "stretch" command, ensuring that the return air box 5 is left-right symmetrical, and enabling the return air box 5 to be locked with the back part of the fan coil;

(4), producing an air pipe behind an air supply flange and at the front part of the fan coil; drawing the air pipe with using the "stretch" command; through adding a reference plane, realizing a parametric control on a distance between an end of the air pipe and an outlet flange; enabling a width of an air supply duct 2 to correspond to specifications of the fan coil, and expanding to a basic modulus of air duct;

(5), producing each air duct flexible connector 4, particularly comprising steps of: setting reference planes respectively at a lower surface of the air supply duct 2 and a top surface of a throat mouth of a corresponding diffuser 3; drawing a contour lofting path of each air duct flexible connector 4 into a curved shape of each air duct flexible connector 4, and locking between the above two reference planes; using a family template file, named "metric contour", and establishing a contour family; drawing a horizontal sectional contour of each air duct flexible connector 4, and loading into a family of the air duct flexible connectors 4; lofting, and completing modeling of each air duct flexible connector 4;

(6), loading the family of the air duct flexible connectors 4 into a family of the fan coil; locating on the air supply duct 2 with using a reference plane; completing center locating of three lower air outlets according to general design requirements, and adding parameters after measuring distance marks by a distance tool, so as to realize a parametric control on a distance between a center of each lower air outlet and the air supply flange; symmetrically arranging the air duct flexible connectors 4 on middle of the lower surface of the air supply duct 2; locking each diffuser 3 at a lower end of the corresponding air duct flexible connector 4; according to a distance between the air supply flange and a corresponding prefabricated air outlet, parametrically controlling a horizontal location of each diffuser 3; with using a reference plane, completing a parameter addition for a distance between the lower surface of the air supply duct 2 and a lower surface of the corresponding air outlet, and parametrically controlling a vertical location of each diffuser 3;

(7), with a center line of the fan coil as a symmetry axis, adding controls, which control in a left-right symmetrical way, for above built models; and completing control settings of left-right one-click selection for pipes, connectors and electric terminals in an overall combined model of the fan coil;

(8), establishing parametric groups, particularly comprising steps of: according to differences between the two-pipe fan coil and the four-pipe fan coil and differences among types of above 8, 8 and below 8, establishing the parametric groups; and (9), setting component visibility, particularly comprising steps of: adding display parameters of a "yes or no" type to the return air box 5, a back return air flange 7, a lower return air flange 6, the diffusers 3 and the corresponding air duct flexible connectors 4, so as to complete a visibility control.

Furthermore, in the step (2), the parametric groups comprise a double-blade type and a four-blade type.

Furthermore, in the step (5), the step of completing the control settings of the left-right one-click selection particularly comprises steps of: in the step (2), with a central axis of the fan coil as a symmetry axis, completing modeling, and adding flip controls, so as to realize the left-right one-click selection; or, at an initial stage of modeling, with a central axis of left and right sides of the fan coil as a symmetry axis, completing modeling, generating and storing another building type after left-right mirroring, and selecting generation in a component group in one click.

Furthermore, in the step (5), the step of completing the control settings of the left-right one-click selection particularly comprises steps of: in the step (2), with a central axis of the fan coil as a symmetry axis, completing modeling, generating and storing another building type after left-right mirroring, and selecting generation in a component group in one click.

Furthermore, the parametric design method further comprises steps of: drawing all components into a finished fan coil sample, plotting a three-dimensional graph thereof, and illustrating.

Furthermore, the parametric design method further comprises steps of: checking parameter control co-movement of models; and, in graphic drawing, completing two-dimensional expression settings under medium and rough detailed degrees.

The detailed usage method of the fan coil unit designed by the present invention is illustrated as follows.

In the heating ventilation air conditioning design of the super-high building project, 700 fan coil equipments are required, wherein: the hotel part therein requires the four-pipe fan coils, and the office part in the podium building requires the two-pipe fan coils; the numbers of fan coil equipments of left type and right type are respectively 580 and 120. There are two air return ways, respectively the down return way by the return air box 5 and the overall return way. In this kind of design, a large number of fan coils are used; and, with the present invention, efficiencies of designing, modeling and plotting are obviously increased.

According to the calculated load, the designer can select the type of the fan coil required by each area; then, according to the space requirements, the number and locations of the air outlets are determined; and finally, the length of the air supply duct is determined. Meanwhile, the height of the diffusers 3 can be freely adjusted. If the down return way by the return air box 5 is selected, the air pipe at the lower part of the return air box 5 is connected to the air supply duct. If the ceiling overall return way is selected, the return air box 5 can be canceled. After arrangement, the plane graph is adjusted to a medium display mode.

In the heating and ventilation BIM design of building engineering by the present invention, efficiencies of designing, modeling and plotting are obviously increased, mainly reflecting in following aspects that:

(1), the designer can directly know the design parameters of the fan coil in the model and directly select the type;

(2), after selecting the type by the designer, the shape specifications corresponding to the model change correspondingly, which increases the facticity and feasibility of the equipment occupied space and pipe connection space, so that the post adjustment is avoided;

(3), the designer can directly parametrically control the length of the air supply duct, and the number, height and locations of the diffusers, which simplifies drawing of various sections and planes and pipe connection in the BIM modeling software; and (4), the down return air and the back return air of the return air box are adjustable, and the return air box can also be canceled, which makes designing and drawing flexible.

What is claimed is:

1. A parametric design method for a fan coil unit based on BIM (Building Information Modeling), comprising steps of:
   (1) determining a basic sample, particularly comprising steps of: selecting a product which meets professional design requirements of heating and ventilation and current national specifications and standards as the basic sample of inclusive design model, and acquiring sample data of a fan coil product;
   (2) parametrically modeling, particularly comprising steps of: adopting a design software for modeling; selecting a family template file, named metric mechanical equipment, in a family library;
   in dialog boxes of family templates and family parameters, ensuring that a checkbox of always being vertical of a selected family is checked; with using a stretch command, drawing a sketch in a plane view, and stretching a height thereof, so as to produce a fan coil casing;
   establishing reference planes respectively at edges of two sides of a fan coil, enabling the reference planes to be respectively aligned with the edges of the two sides of the fan coil and locked, and meanwhile enabling the reference planes to be symmetrical with respect to a reference plane of center left and right in an original family;

aligning a front part of the fan coil casing with a reference plane of center front and back in an original family; and, in a same way, completing production of a motor and a fan at a back part and an air-out flange at a front part of the fan coil;

(3) setting pipe connection locations and connection sizes of a two-pipe fan coil and a four-pipe fan coil, a size of a return air box, and a size of a return air inlet, particularly comprising steps of:

establishing a reference plane at a side of the fan coil casing, and enabling the reference plane to accurately describe the pipe connection locations for water supply and return of the two-pipe fan coil and the four-pipe fan coil;

using a stretch tool, and producing a pipe connection member for water supply and return pipes;

according to drawing parameters in the sample data, setting a length and a distance to other pipe connections of the pipe connection member;

after completing above operations, defining virtual connector parameters at an end of each pipe, and enabling a diameter of the pipe connection member to be consistent with a diameter of a solid connector and conform to a diameter of pipe connection in the sample data;

producing the return air box with using a stretch command, ensuring that the return air box is left-right symmetrical, and enabling the return air box to be locked with a back part of the fan coil;

(4) producing an air pipe behind an air supply flange and at a front part of the fan coil; drawing the air pipe with using the stretch command;

through adding a reference plane, realizing a parametric control on a distance between an end of the air pipe and an outlet flange;

enabling a width of an air supply duct to correspond to specifications of the fan coil, and expanding to a basic modulus of air duct;

(5) producing each air duct flexible connector, particularly comprising steps of:

setting reference planes respectively at a lower surface of the air supply duct and a top surface of a throat mouth of a corresponding diffuser;

drawing a contour lofting path of each air duct flexible connector into a curved shape of each air duct flexible connector, and locking between the above reference planes;

using a family template file, named metric contour, and establishing a contour family;

drawing a horizontal sectional contour of each air duct flexible connector, and loading into a family of the air duct flexible connectors; lofting, and completing modeling of each air duct flexible connector;

(6) loading the family of the air duct flexible connectors into a family of the fan coil;

locating on the air supply duct with using a reference plane;

completing center locating of three lower air outlets according to general design requirements, and adding parameters after measuring distance marks by a distance tool, so as to realize a parametric control on a distance between a center of each lower air outlet and the air supply flange;

symmetrically arranging the air duct flexible connectors on middle of the lower surface of the air supply duct;

locking each diffuser at a lower end of the corresponding air duct flexible connector;

according to a distance between the air supply flange and a corresponding prefabricated air outlet, parametrically controlling a horizontal location of each diffuser;

with using a reference plane, completing a parameter addition for a distance between the lower surface of the air supply duct and a lower surface of the corresponding air outlet, and parametrically controlling a vertical location of each diffuser;

(7) with a center line of the fan coil as a symmetry axis, adding controls, which control in a left-right symmetrical way, for above built models; and completing control settings of left-right one-click selection for pipes, connectors and electric terminals in an overall combined model of the fan coil;

(8) establishing parametric groups, particularly comprising a step of:

according to differences between the two-pipe fan coil and the four-pipe fan coil, establishing the parametric groups; and (9) setting component visibility, particularly comprising steps of: adding display parameters of a yes or no type to the return air box, a back return air flange, a lower return air flange, the diffusers and the corresponding air duct flexible connectors, so as to complete a visibility control.

2. The parametric design method for the fan coil unit based on BIM according to claim 1, wherein in the step (2), the parametric groups comprise a double-blade type and a four-blade type.

3. The parametric design method for the fan coil unit based on BIM according to claim 1, wherein in the step (5), the step of completing the control settings of the left-right one-click selection particularly comprises steps of: in the step (2), with a central axis of the fan coil as a symmetry axis, completing modeling, and adding flip controls, so as to realize the left-right one-click selection; or, at an initial stage of modeling, with a central axis of left and right sides of the fan coil as a symmetry axis, completing modeling, generating and storing another building type after left-right mirroring, and selecting generation in a component group in one click.

4. The parametric design method for the fan coil unit based on BIM according to claim 1, wherein in the step (5), the step of completing the control settings of the left-right one-click selection particularly comprises steps of: in the step (2), with a central axis of the fan coil as a symmetry axis, completing modeling, generating and storing another building type after left-right mirroring, and selecting generation in a component group in one click.

5. The parametric design method for the fan coil unit based on BIM according to claim 1, further comprising steps of: drawing all components into a finished fan coil sample, and plotting a three-dimensional graph thereof.

6. The parametric design method for the fan coil unit based on BIM according to claim 1, further comprising steps of: checking parameter control co-movement of models; and, in graphic drawing, completing two-dimensional expression settings under medium and rough detailed degrees.

* * * * *